May 13, 1924.                J. E. I. BAUDOUX                1,493,797
                              FRICTION CLUTCH
                           Filed Jan. 25, 1921            2 Sheets-Sheet 1

Inventor
Joseph Eloi Isidore Baudoux
By
Mann, Cameron, Lewis & Kerkam
Attorneys

Patented May 13, 1924.

1,493,797

UNITED STATES PATENT OFFICE.

JOSEPH ELOI ISIDORE BAUDOUX, OF PARIS, FRANCE, ASSIGNOR TO SCHNEIDER & CIE., OF PARIS, FRANCE, A JOINT STOCK COMPANY OF FRANCE.

FRICTION CLUTCH.

Application filed January 25, 1921. Serial No. 439,849.

*To all whom it may concern:*

Be it known that I, JOSEPH ELOI ISIDORE BAUDOUX, a citizen of the Republic of France, resident of Paris, France, have invented new and useful Improvements in Friction Clutches, which invention is fully set forth in the following specification.

The present invention has for its object a particularly practical mode of construction of the clutch described in my pending application filed June 23, 1920, Serial Number 391,125.

Figure 1:
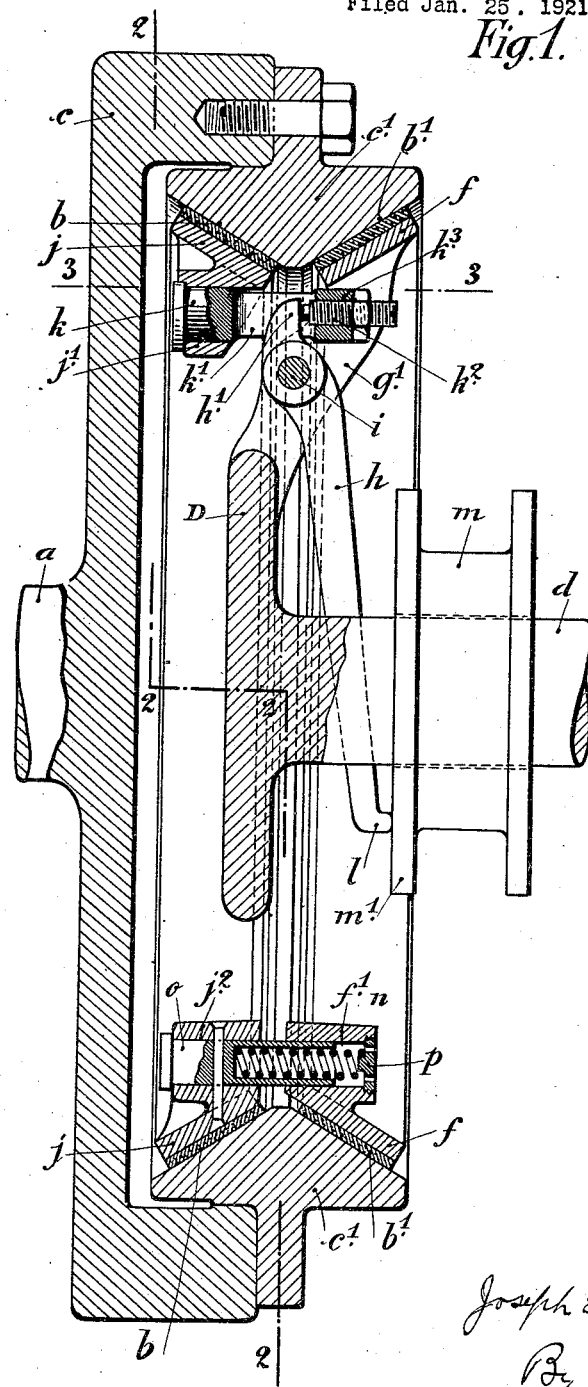
Figure 2:
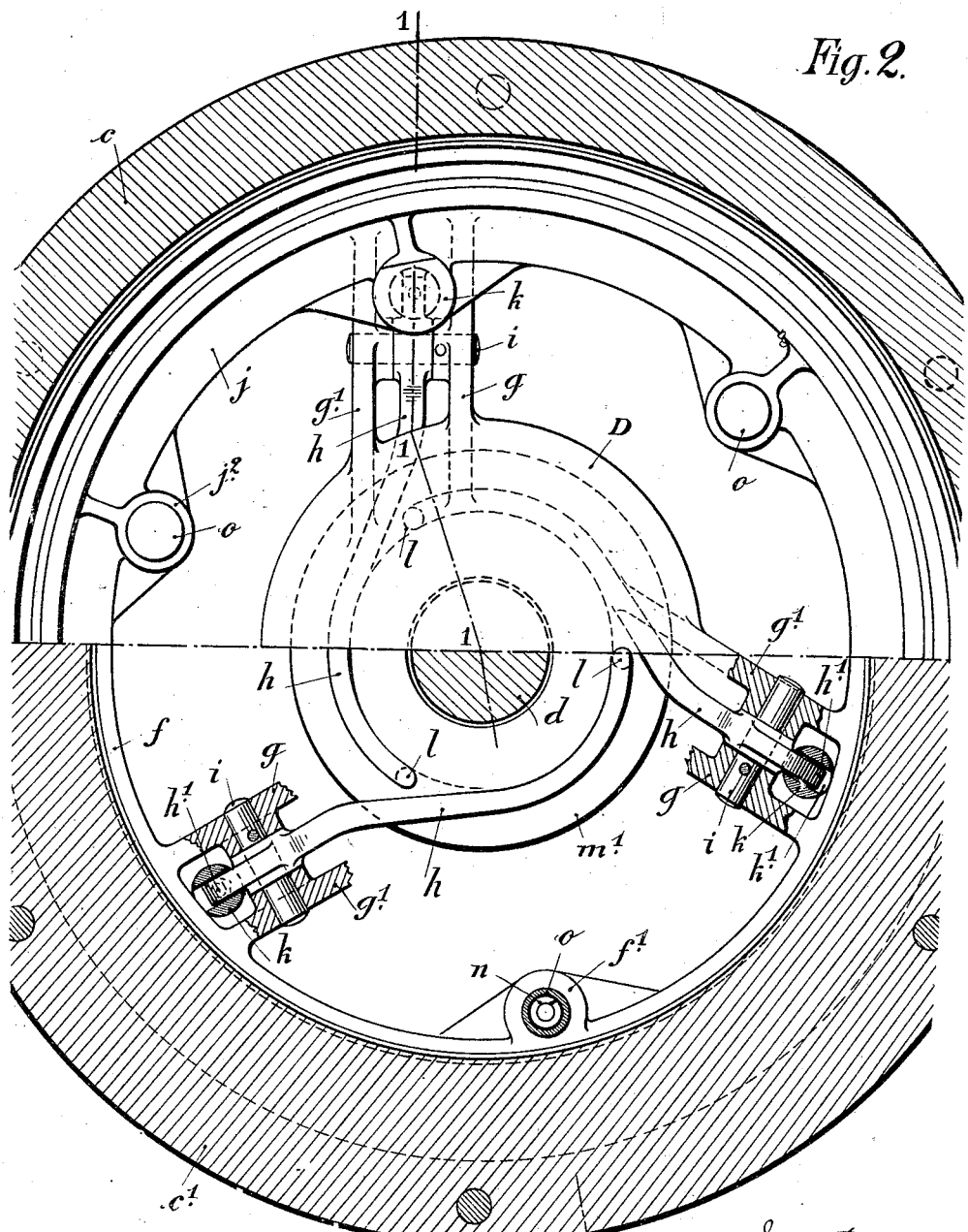

The invention is illustrated in detail in the accompanying drawings in which,

Fig. 1 is a vertical section of the clutch taken along the common axis of the two shafts (driving shaft $a$ and driven shaft $d$) and along the line 1—1 of Fig. 2.

Figure 3:
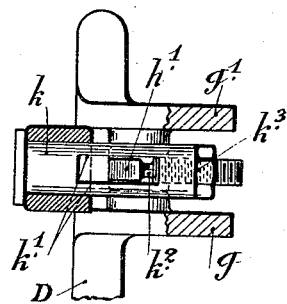

Figs. 2 and 3 are sections made along the lines 2—2 and 3—3 of Fig. 1 respectively.

The clutch is, like the one which is the object of application Serial Number 391,125, of the known type described in the French Patent No. 402,934, of May 13, 1909, and comprises, on the driven shaft $d$, nippers, one arm of which is movable, the jaws $f$ and $j$ of the nippers being capable of gripping a crown $c^1$ on a fly-wheel $c$ carried by the driving shaft $a$. Each of the fixed arms of the tongs rendered integral with the driven shaft $d$ by means of a disc D formed at its end, comprises a forked bracket $g$—$g^1$ forming a support for the fulcrum axle pin of the corresponding movable arm. According to the present invention the movable arms are constructed in a special manner. The fixed arms $g$—$g^1$ of the tongs are attached to a continuous crown $f$ and the disk D, these parts having the form of a spider integral with the shaft $d$.

According to the present invention, the movable arms of the tongs and the supporting crown $c^1$ of the jaws $f$, $j$ are constructed in such manner that the latter can both be formed on continuous crowns, the practice having shown that the use of a separate jaw for each movable arm of the tongs causes a rapid and irregular wear of the said jaws and, therefore, an insufficient gripping.

According to the present improvements, the jaws of the movable arms $h$ of the tongs are connected together, so as to form a continuous crown $j$ having preferably the shape of a frustum of a cone and designed to bear against a surface $b$ having a similar shape, of the crown $c^1$ which is removably attached to the fly-wheel $c$. The bearing surface $b$ is symmetrical with the bearing surface $b^1$ of the continuous jaw $f$. In order that the continuous crown shall be operated by an oscillating motion of the movable arms of the tongs $h$ pivoted around axles $i$, it is rendered independent of the said arms each of which is provided with a nose $h^1$ engaging in a slot $k^1$ of a pin $k$ which is carried by a corresponding boss $j^1$ of the continuous crown $j$.

The nose $h^1$, instead of displacing the pin $k$ by a pressure exerted on the bottom of the slot $k^1$, may bear against an abutment pin $k^2$ the projecting portion of which inside the groove $k^1$ may be adjusted by screwing it into the part $k^3$ acting as a nut.

In the example which has been illustrated, it has been supposed that the clutch comprises three tongs. The gripping of the crown $c^1$ of the fly-wheel by the jaws $j$, $f$ is obtained in the known manner by actuating the movable arms $h$ the inner ends $l$ of which may, to this end, bear against a disc $m^1$, formed on a sleeve $m$ sliding on the driven shaft $d$.

The loosening may be effected automatically after the pressing sleeve $m$ has been moved aside, under the action of a series of springs $n$ each bearing at one end on the bottom of a recess provided in a boss $j^2$ of the crown $j$ and at the other end on the bottom of a boss $f^1$ of the crown $f$. With a view to facilitating the mounting, the supports of the springs $n$ are preferably formed on removable members $o$, $p$ situated in recesses $j^2$ and $f^1$ respectively. In that case, the members $o$ are constructed in the form of sockets engaging in bosses $j^2$ and serve at the same time for centering the crown $j$ and for guiding it in its movement towards or away from the crown $c^1$. It is of course to be understood that the crown $j$ can be centered on the crown $f$ by any other suitable means.

I claim:

1. In a clutch, a driving member and a driven member, an annular crown on one of said members, tong-like means on the other of said members comprising a plurality of levers pivoted intermediate their ends, an annular jaw at one side of said crown, a second annular jaw at the opposite side of said crown, means on said last-named jaw engaging the outer ends of said levers, and means for moving said levers to cause engagement of said jaws with said crown.

2. In a clutch, a driving member and a driven member, an annular crown on one of said members provided with oppositely inclined friction surfaces, tong-like means on the other of said members comprising a plurality of levers pivoted intermediate their ends, an annular jaw at one side of said crown, a second annular jaw at the opposite side of said crown, adjustable means on said second jaw engaging the outer ends of the levers, and means for moving said levers to cause engagement of the jaws with the inclined friction surfaces of said crown.

3. In a clutch, a driving member and a driven member, an annular crown on one of said members, a spider on the other of said members and disposed within the annular crown, levers pivoted intermediate their ends on the arms of said spider, a pair of annular jaw members disposed in said crown adjacent opposed friction surfaces thereof, one jaw member being mounted on the ends of the spider arms and the other jaw member being operatively related with said levers, and means for operating the levers to cause engagement of said jaw members with said crown.

4. In a clutch, a driving member and a driven member, an annular crown on one of said members provided interiorly with opposed friction surfaces, a spider on the other of said members and disposed within said annular crown, levers pivoted intermediate their ends on the arms of said spider, a pair of annular jaw members arranged within said annular crown in proximity to the opposed interior friction surfaces thereof, one jaw member being mounted on the ends of the spider arms and the other jaw member being operatively related with the outer ends of said levers, means for operating said levers to cause engagement of said jaw members with the crown, and means interposed between the jaw members adapted to release the same from said crown when said operating means is made non-effective.

5. In a clutch, a driving member and a driven member, tong-like means for transmitting power from the driving member to the driven member, said means comprising a spider on one of said members provided with an annular jaw portion, a plurality of levers pivoted intermediate their ends on the arms of said spider, an independent annular jaw member, and adjustable means on said member engaging the outer ends of said levers.

6. In a clutch, a driving member, and a driven member, an annular crown on one of said members, tong-like means on the other of said members comprising an annular jaw at one side of said crown and a plurality of levers pivoted intermediate their ends, a second annular jaw at the opposite side of said crown, slotted pins extending from said second jaw and engaging the outer ends of said levers, and means for moving said levers to cause engagement of said jaws with said annular crown.

7. A clutch comprising a driving member and a driven member, an annular crown carried by one of said members and providing oppositely disposed friction surfaces, an annular jaw rigid with the other of said members, an independent annular jaw having slotted pins extending therefrom, and means for imparting relative movement to said jaws whereby the latter may be caused to engage the friction surfaces of said annular crown, said means comprising levers pivoted to the rigid jaw and engaging in the slots of said pins and a member for actuating said levers.

8. A clutch comprising a driving member and a driven member, one of said members having a crown providing oppositely disposed friction surfaces and the other of said members having a rigid jaw disposed on one side of said crown, a loose jaw disposed on the opposite side of said crown and having slotted pins extending therefrom, and means for imparting relative movement to said jaws whereby the latter may be caused to engage the friction surfaces of said crown, said means comprising levers pivoted to the rigid jaw, and engaging in the slots of said pins, and a member for actuating said levers.

9. A clutch comprising a driving member and a driven member, a crown on one of said members, tong-like power transmitting means on the other of said members comprising a jaw portion at one side of said crown and a plurality of levers pivoted intermediate their ends, an independent jaw member at the opposite side of said crown, adjustable devices removably mounted on said jaw member and engaging the outer ends of said levers, means for operating said levers to cause engagement of said jaws with said crown, and means interconnecting said jaws and removably mounted therein for automatically disengaging the jaws from said crown when the operating means has been made non-effective.

10. A clutch comprising a driving member and a driven member, one of said members having an annular crown providing oppositely disposed friction surfaces and the other of said members having an annular jaw disposed at one side of said crown, a second annular jaw disposed at the opposite side of said crown and having slotted pins extending therefrom, means for imparting relative movement to said jaws whereby the latter may be caused to engage the friction surfaces of said crown, said means comprising tong-like devices pivotally connected with said jaws and having levers thereof engaging in the slots of said pins, a member for actuating said devices, and coil springs interconnecting said annular jaws and automatically disengaging the latter from said crown when the actuating member has been made non-effective.

In testimony whereof I have signed this specification.

JOSEPH ELOI ISIDORE BAUDOUX.